UNITED STATES PATENT OFFICE.

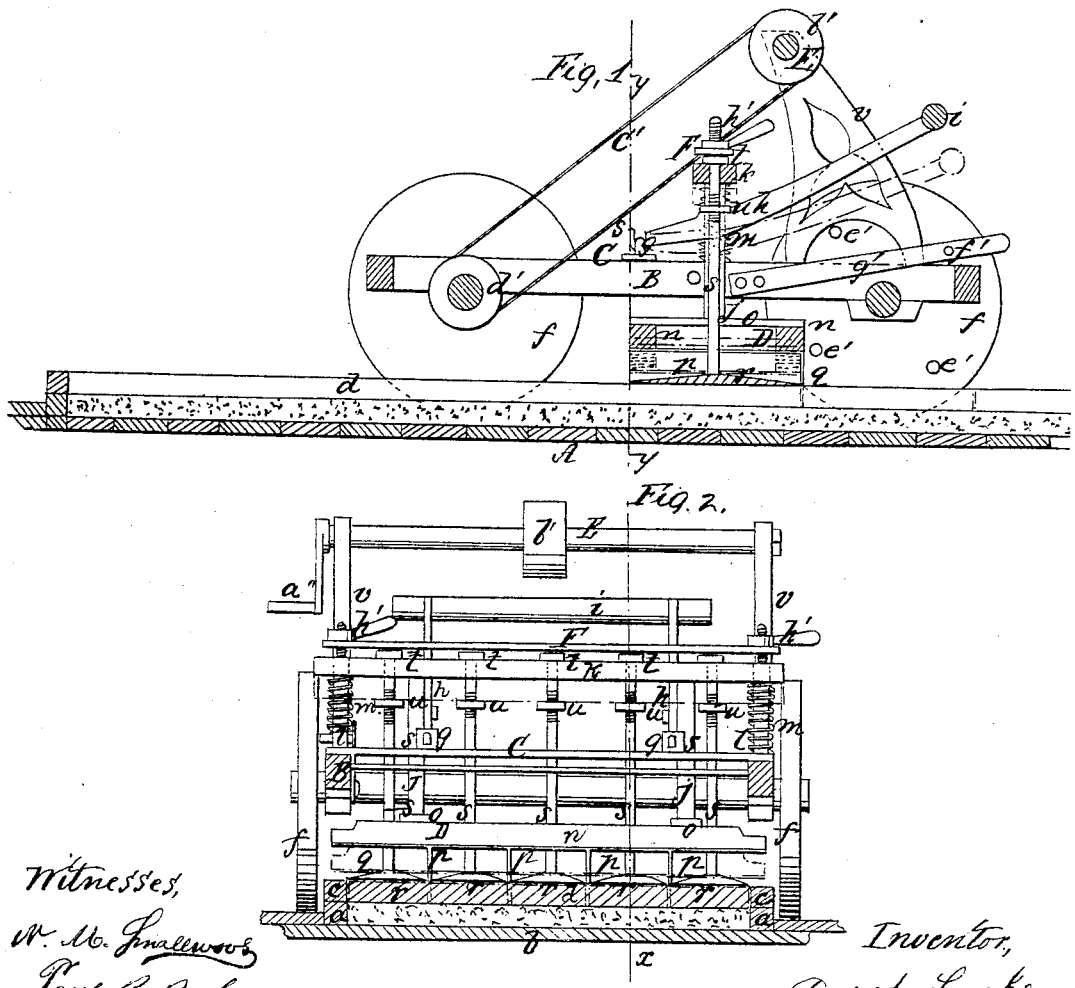

DAVID LOCKE, OF LEXINGTON, MISSOURI.

BRICK-MACHINE.

Specification of Letters Patent No. 23,691, dated April 19, 1859.

*To all whom it may concern:*

Be it known that I, DAVID LOCKE, of Lexington, in the county of Lafayette and State of Missouri, have invented certain new and useful Improvements in Machinery for Manufacturing Bricks; and I do hereby declare that the following is a full, clear, and exact description of the same, reference being had to the annexed drawings, making a part of this specification, in which—

Figure 1, is a side sectional view of my invention, taken in the line $x$, $x$, Fig. 2. Fig. 2, is a transverse vertical section of do, taken in the line $y$, $y$, Fig. 1.

Similar letters of reference indicate corresponding parts in the two figures.

This invention consists in having the tempered clay placed in suitable layers on platforms slightly elevated above the surface of the ground, the layers being made of a thickness corresponding to the thickness of the bricks to be formed, and of any desired width or length, and using in connection with the layers of tempered clay a machine constructed substantially as hereinafter described, and mounted on wheels or so arranged that it may be moved over the layers and made to cut the layers of clay into bricks.

By this invention the process of manufacturing bricks is greatly expedited and facilitated, and the work may be done in a superior manner much better than can be done by the ordinary process of molding either by hand or by machinery.

To enable those skilled in the art to fully understand, manufacture and use my invention I will proceed to describe it.

In the first place I construct a platform A, one or more, by laying down parallel pieces of scantling $a$, $a$, connected by cross ties $b$, the space between the scantling $a$, $a$, or rather the width of the platform corresponding to the width of the machine hereinafter described. The space between the scantling being filled in with clay and sand $a'$, well tempered, rammed down, and leveled so as to form a hard smooth surface "flush" with the upper surfaces of the scantling $a$, $a$. The platform thus formed may be elevated more or less above the surface of the ground, a few inches according to the height of the scantling and if more than one platform is used, they are formed side by side, a sufficient space being allowed between them to serve as a passageway.

On each platform A, two parallel and longitudinal side strips $c$, $c$, are placed, and secured in any proper manner. The side strips are equal in height or depth to the thickness of the bricks to be made. The space between the side strips $c$, $c$, on the platforms is filled with tempered clay $d$, smoothed and made level and "flush" with the upper surfaces of the side pieces, by means of any suitable implements. The clay is tempered and treated in the usual way previous to being formed in layers $d$, on the platforms A. The bricks are cut from these layers by means of a machine constructed as follows.

B, is a rectangular frame mounted on four wheels $f$, which run on the platforms at the outer sides of the side strips $c$, $c$, which serve the office of guides for the wheels. On this frame B, a cross bar C, is secured, said bar having two eyes $g$, $g$, attached in which the end of bars $h$, $h$, are fitted by hooks $s$, formed on them. The outer ends of the bars $h$, $h$, are connected by a cross bar $i$, and each bar $h$, $h$, is attached to a vertical rod $j$, to the upper ends of which a bar $k$, is attached. The outer ends of the bar $k$, work on vertical guide rods $l$, attached to the frame B, each rod $l$, being provided with a spiral spring $m$, said springs $m$, sustaining the bar $k$, when not depressed by any extraneous force or power. To the lower ends of the rods $j$, $j$, a frame D, is attached, said frame being formed of two parallel bars $n$, $n$, connected by plates $o$, $o$, the rods $j$, $j$, being attached to the latter. To the under side of the frame D, a series of vertical plates or cutters $p$, are attached. The space between these plates are equal to the width of a brick, and more or less may be used according to the width of the layer $d$, of clay on the platform. To the back end of the frame D, a plate or cutter $q$, is attached, the latter extending the whole length of the frame and at right angles to the plates or cutters $p$.

Between the plates or cutters $p$, horizontal plates $r$, are placed and fitted loosely. Each plate $r$, is attached to a vertical rod $s$, the upper parts of which have screw threads formed on them and pass loosely through the bar $k$, and have plates $t$, attached. On the screw portion of each rod $s$, a nut $u$, is placed. E, is a shaft the bearings of which are in the upper ends of uprights $v$, $v$, attached to the frame B. This shaft has a crank $a''$, at one end and a pulley $b'$, at its center. Around the pulley $b'$ a belt $c'$, passes, said belt also passing around a pulley $d'$, on the front axle of the machine. The inner side of one of the wheels $f$, has holes $e'$, made in its inner side and a pin $f'$, attached to a spring plate $g'$, fits or catches into these holes as the machine is shoved along, and causes said machine to move intermittingly and at equal distances. F, is a plate or bar which is fitted on the upper ends of the rods $l$, $l$, and above the bar $k$, and on the upper end of each rod $l$, a thumb nut $h'$, is placed.

The operation is as follows: The layer $d$, of clay being properly formed, on the platform A, the attendant places the machine on the track or over the layer of clay $d$, at one end and depresses the bars $h$, $h$, and by that means forces down the plates or cutters $p$ and $q$, through the layer $d$, of clay, the plates $r$, remaining stationary, and the bar $k$, bearing on the nuts $u$. The attendant then by operating the thumb nuts $h'$, screws the plate or bar F, down on the plates $t$, which causes the plates $r$, to press on the top of the clay $d$. The plates or cutters $p$ $q$, are then allowed to spring up, leaving the plates $t$, bearing on the bricks which are cut from the layer $d$, by the descent of the plates or cutters $p$, $q$. The thumb nuts $h'$ are then unscrewed and the plates $t$ loosened or the bricks relieved of their pressure. The machine is then moved forward over the layer $d$, a distance corresponding to the lengths of the bricks, and this distance is determined by means of the pin $f'$, of the spring plate or bar $g'$, catching into the holes $e'$. The plates or cutters $p$, $q$, it will be seen serve as molds to a certain extent as the plates $r$, compress the clay between them. The machine of course is moved along over the entire length of the layer $d$, and may then be transferred on another layer $d$. if more than one platform is employed. Each platform may be provided with a canvas so that the bricks may be protected from wet if necessary,—the bricks being allowed to dry on the platforms which by absorption dry the under sides of the bricks about as rapidly as evaporation above, thereby obviating the necessity of "edging" the bricks.

Having thus described my invention what I claim as new and desire to secure by Letters Patent, is,

The elevated layer of tempered clay $d$, arranged or formed substantially as shown, in connection with the traveling plates or cutters $p$, $q$, and pressure plates $r$, arranged to operate substantially as and for the purpose set forth.

DAVID LOCKE.

Witnesses:
W. M. SMALLWOOD,
PAUL R. BAKER.